United States Patent Office 2,910,768
Patented Nov. 3, 1959

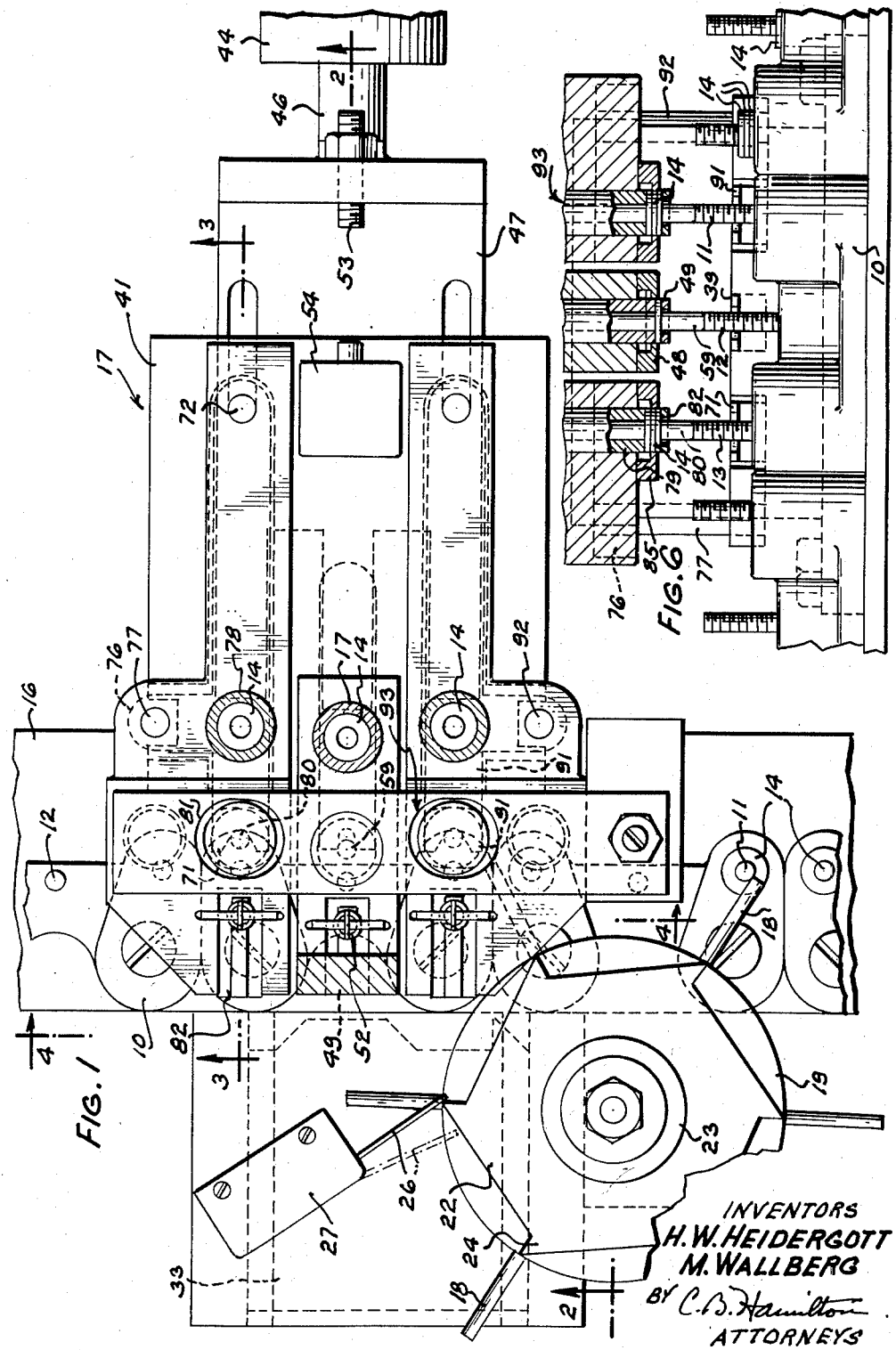

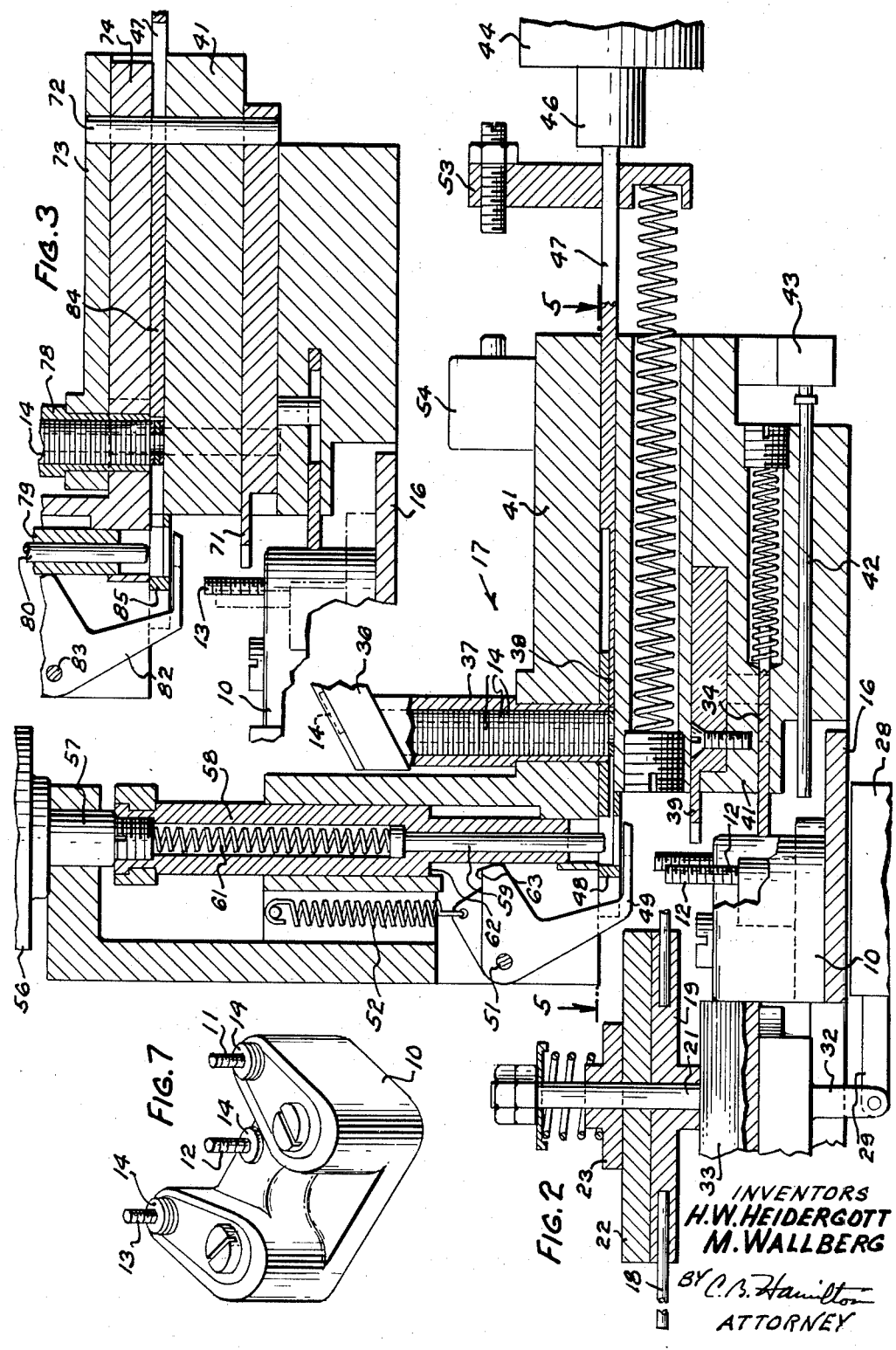

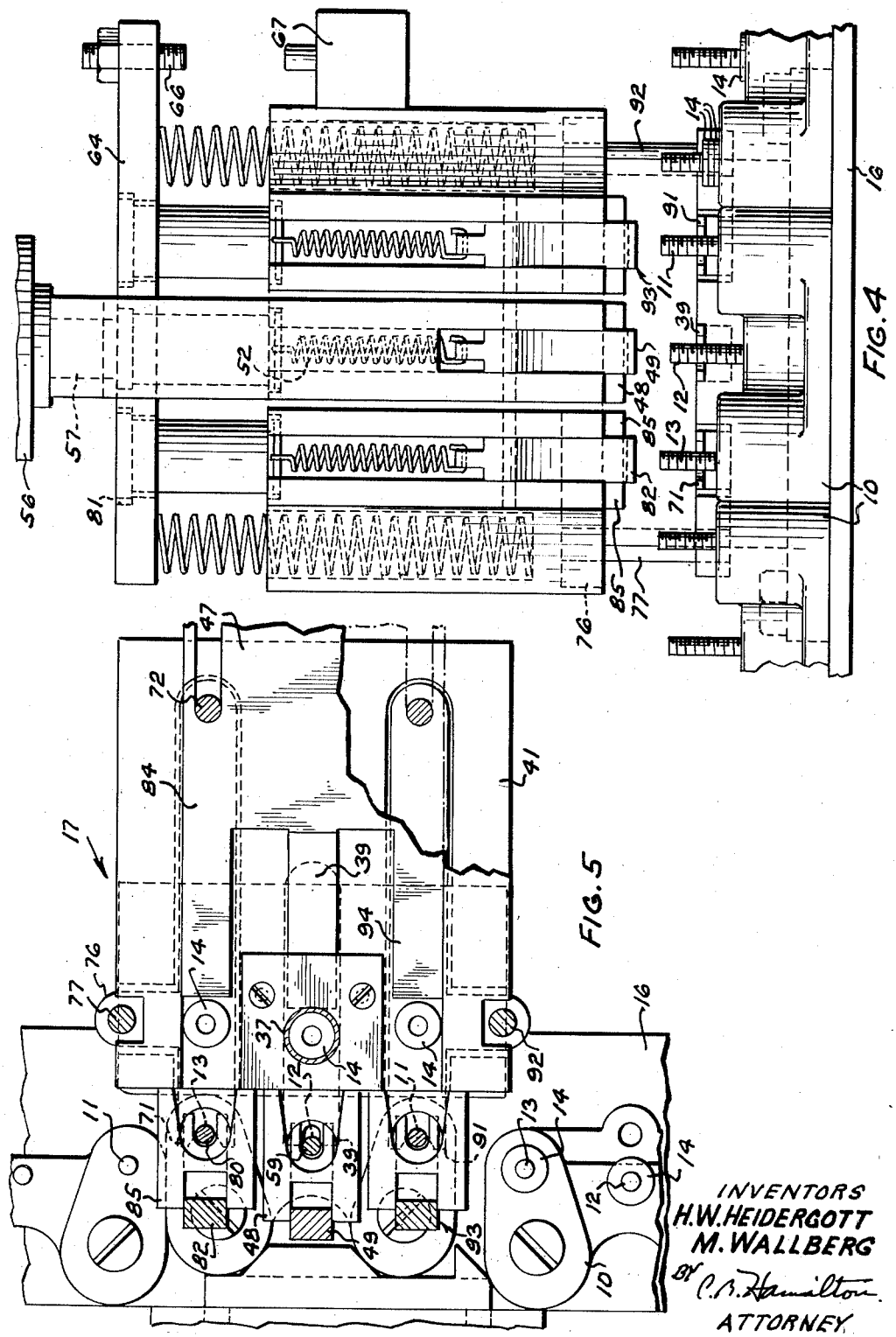

2,910,768

MACHINES FOR ASSEMBLING PARTS ON DIVERSELY LOCATED PORTIONS OF ARTICLES

Harry W. Heidergott and Marshall Wallberg, Indianapolis, Ind., assignors to Western Electric Company, Incorporated, New York, N.Y., a corporation of New York Application January 9, 1957, Serial No. 633,274

12 Claims. (Cl. 29—211)

This invention relates to machines for assembling parts on diversely located portions of articles, and more particularly to a machine for assembling annular-like members on a plurality of posts extending from an article wherein facilities are provided to compensate for variations in the locations of the posts on successive articles.

In the assembly of many articles of manufacture, it is necessary to place washers or other annular-shaped members on a plurality of threaded or unthreaded posts extending from the articles. Usual manufacturing techniques produce these articles wherein the posts are non-uniformly spaced, thus necessitating manual assembly of the washers on the posts. Obviously, manual assembly is a time consuming and tedious task. Automatic machines are not readily adapted to perform these assembly functions where each post on each article is not precisely located in the exact same position on each succeeding article.

It is a primary object of this invention to provide a machine for automatically assembling parts on sections of a series of articles wherein said sections are not uniformly spaced on each succeeding article.

Another object of the invention resides in a machine for simultaneously assembling washers on a plurality of posts extending from an article.

A further object of the invention is the provision of a machine for successively assembling washers on posts extending from a series of articles having facilities for compensating for variations in the locations of the posts on each succeeding article.

With these and other objects in view, the present invention contemplates an assembling machine for automatically placing washers on a plurality of posts extending from a terminal block. The terminal blocks are advanced along a conveyor to a machine whereat gripping means are actuated to hold the terminal block in position during an assembling operation. As the block is positioned in the machine, movably mounted compensating elements are engaged and positioned by the terminal posts. These compensating elements are connected to movably mounted washer feed mechanisms to move the mechanisms into position to advance the washers onto the posts. Upon assembly of the series of washers on the posts, facilities are actuated to release the terminal block gripping means whereupon the conveyor advances the assembled terminal block out of the machine and moves a new block into position to have the washers assembled thereon.

Other objects and advantages will be apparent from the following detailed description when considered in conjunction with the accompanying drawings, wherein Fig. 1 is a top plan view of a washer assembling machine embodying the principal features of the present invention;

Fig. 2 is a sectional view taken along line 2—2 of Fig. 1 illustrating one of the washer feed mechanisms;

Fig. 3 is a sectional view taken along line 3—3 of Fig. 1 showing a compensating washer feed mechanism;

Fig. 4 is a front elevational view of the machine showing three washer feed mechanisms;

Fig. 5 is a sectional view taken along line 5—5 of Fig. 2 illustrating a pusher device for advancing washers onto three posts extending from a terminal block;

Fig. 6 is a partial front elevational view illustrating the positionment of three groups of washers on three posts extending from a terminal block, and Fig. 7 is a perspective view of a terminal block that has groups of washers positioned thereon by the machine shown in Figs. 1 to 6.

Referring to the drawings there is shown in Fig. 7 a block 10 having a plurality of posts 11, 12 and 13 extending therefrom and onto which it is desired to assemble washers 14. The terminal blocks 10 are placed on a continuously moving conveyor 16 (see Figs. 1 and 2), and are successively advanced to the washer assembly machine generally designated by the reference numeral 17. As a block is exited from the machine 17, the terminal post 11 engages one of a plurality of pins 18 radially extending from a rotatably mounted disc 19. The disc 19 is rotatably mounted on a shaft 21 and a cam 22 is also mounted on this shaft and is urged into engagement with the disc through the instrumentality of a spring-biased pressure plate 23. As the disc 19 and cam 22 rotate, one of a series of lobes 24 engages an actuating member 26 of a switch 27. Switch 27 energizes a solenoid (not shown) that in turn controls the application of air to a hydraulic cylinder 28. The air pressure in the cylinder forces a plunger 29 toward the right as viewed in Fig. 2. Plunger 29 is attached to an abutment 32 extending from the underside of a slide 33. The slide 33 advances toward the right to move the terminal block into engagement with a spring-biased holding plate 34 having an engaging configuration substantially identical with the contour of the righthand face of the block 10. The conveyor 16 continues to move but now does not advance the held terminal block 10.

Considering the washer feed mechanism shown in Fig. 2, it will be noted that washers 14 are advanced down an inclined chute 36 into a stack 37 wherein the lowermost washer is positioned in register with a slide 38. As the block 10 is moved toward the right, the center terminal post 12 is engaged by a bifurcated guide or locating member 39 rigidly mounted within a base block 41 of the machine. The movement of the terminal block also effectuates the movement of a plunger 42 into engagement with a switch 43 that closes to energize a solenoid (not shown). This solenoid controls the application of air to a cylinder 44, and immediately thereupon a plunger 46 is advanced toward the left to move a pusher plate 47 toward the left. Slide 38 is formed integral with the pusher plate 47; consequently, the lowermost washer 14 is advanced into an apertured guide member 48. When the block 10 has been advanced so that the terminal post 12 is fully positioned within the bifurcations of member 39, the post is in alignment with the aperture formed in the guide member 48. Positioned beneath the aperture in the guide member is a forked holding member 49 pivotally mounted about a stud shaft 51 and maintained in position through the agency of an extended tension spring 52.

Attached to the pusher plate 47 is an actuator 53 adapted to operate a switch 54 when the lowermost washer 14 has been advanced within the guide member 48. Switch 54 operates a solenoid (not shown) that controls the application of air to a cylinder 56. This air pressure applied to cylinder 56 moves a plunger 57 downwardly advancing a sleeve 58 toward the washer held in the forked portion of the holding member 49. Positioned within sleeve 58 is a guide rod 59 urged by a spring 61 into a position to extend beyond the lower extremity of the sleeve 58. As sleeve 58 and guide rod 59 advance, the guide rod 59 passes through the aperture in the washer and into engagement with the aligned terminal post 12. Simultaneously therewith, an abutment 62 on the sleeve 58 engages a projection 63 formed on the holding member 49 to pivot this member in a clockwise direction thereby permitting the washer to move downwardly onto the post 12. Further movement of the sleeve 58 causes the holding member 49 to pivot completely out from under the assembled washer 14.

Referring to Fig. 4, it will be noted that the plunger 57 moves a rectangular-shaped support member 64 carrying on its outer extremity an actuating screw 66. When the washer 14 has been assembled on the post 12, the actuator screw 66 will operate a switch 67 to interrupt the operating circuits to the solenoids controlling the air cylinders 28, 44 and 56. Immediately thereupon the slide block 33 is moved to the left, as viewed in Fig. 2, and the spring-biased pusher 34 pushes the terminal block 10 toward the left to move the terminal post 12 from engagement with the bifurcated holding member 39. Thereafter, the conveyor 16 is rendered effective to advance the terminal block from the assembling machine.

So far the description has only discussed the application of a single washer to a terminal post 12. Consideration will now be given to the assembly of washers on the terminal posts 11 and 13. In the manufacture of the terminal blocks 10, it has been found that the terminal posts are not exactly located in the same position with respect to each other on each block, but rather there will be a slight variation in the relative locations of each post on each succeeding block. In order to accurately position the washers on the terminal posts 11 and 13, it is necessary that compensating facilities be provided for the washer feed mechanism to align the inserting elements with the posts prior to the assembly thereon of the washers.

Referring now to Figs. 1, 3, 4, 5 and 6, the assembly of three washers on the post 13 will now be explained, and it will be understood that substantially identical mechanisms are provided for applying three washers on the post 11. When the terminal block 10 is advanced by the slide 33, the post 13 engages a pair of cammed surfaces formed on bifurcations of a guide or locating member 71. If the cammed surfaces are not centered with respect to the terminal post 13, there will be a slight movement imparted to the guide member 71. Looking at Figs. 3 and 5, it will be noted that guide member 71 is pivotally mounted about a stud shaft 72 that extends up through a portion of the base block 41 to provide a pivotal mounting for a stack holder 73 and an applicator mounting frame 74. Guide member 71 is also provided with an ear-like extension 76 having mounted therein a rod 77 that extends up and engages apertures formed within the stack holder 73 and applicator mounting frame 74. Manifestly any movement imparted to the guide member 71 by the nonalignment of the terminal post 13 causes both the stack holder 73 and the application mounting frame 74 to shift.

Stack holder 73 has mounted therein a tube or stack 78 into which is fed a series of washer-like elements 14. Applicator mounting frame 74 has slidably mounted therein a plunger 79 that is loosely mounted at its upper extremity within elongated slots 81 (see Figs. 1 and 4). Plunger 79 is provided with a spring-biased guide rod 80 similar to rod 59 that will now be in alignment with the terminal post 13. Applicator mounting frame 74 also has mounted thereon a forked holding member 82 pivotally mounted about a pivot pin 83 secured to the applicator mounting frame. Also mounted on the applicator frame is a slotted cylindrical guide member 85 for receiving washers and holding them in position on the forked arms of the member 82. Looking at Fig. 3, there is slidably mounted between the base block 41 and the applicator frame 74 a portion 84 of the pusher plate 47. It will be noted that this portion of the pusher plate is of sufficient thickness to engage and move three washers 37 from the stack into the cylindrical guide member 85.

When the plunger 57 is actuated to move the support member 64 downwardly, the plunger 79 and guide rod 80 move downwardly so that the rod 80 passes through the apertures formed in the washers 37 and into engagement with the upper extremity of the terminal post 13. As the plunger 79 advances, an abutment formed thereon (not shown) similar to abutment 62 engages and pivots the forked member 82 out from beneath the washers to permit their movement down onto the terminal post 13.

Referring to Figs. 4, 5 and 6, it will be noted that there is an assembly mechanism positioned above the terminal post 11 substantially identical to that positioned above the terminal post 13. When the terminal post 11 is moved into the assembly position, a guide member 91 is engaged to shift an actuator rod 92 either to the left or right to compensate for the misalignment of the terminal post 11 with respect to the cammed inner surface of the bifurcations formed on the guide member 91. A plunger actuated application mechanism similar to the mechanism positioned above the post 13, generally designated by the reference numeral 93, advances a series of three washers onto the post 11.

In summary, it may be appreciated that as each terminal block is moved into the assembly position the guide members 71 and 91 are moved to position the respective plunger-actuated assembly mechanisms in register with the respective terminal posts. The advance of the pusher plate 47 through the instrumentality of portions 84 and a portion 94 advances two groups of three washers onto the terminal posts 11 and 13. The center portion of the pusher plate 38 advances a single washer onto the terminal plate 12. As the assembly operation is completed, the screw 66 actuates the switch 67 to disrupt the energizing circuit for the operation of the air cylinders 28, 44 and 56. Immediately thereupon the slide 33 is withdrawn and the spring-biased holding member 34 pushes the assembled terminal block back onto the conveyor 16 whereupon the terminal block is advanced out of the assembly machine and a new block advanced therein to initiate another cycle of operation.

It will be understood that the above-described arrangements of apparatus and construction of elemental parts are simply illustrative of an application of the principles of the invention and many other modifications may be made without departing from the invention.

What is claimed is:

1. An assembling machine, a supporting structure, a plurality of assembling mechanisms, movable mountings on said supporting structure for holding said assembling mechanisms, means for advancing an article into position to have assembling operations performed thereon, and guide means connected to said assembly mechanisms and actuated by the advance of the article for moving the mountings to position the assembling mechanisms in alignment with said positioned article.

2. In a machine for assembling parts onto predetermined sections of an article, a plurality of movably mounted assembling mechanisms, means for supporting said mechanisms, a movably mounted guide member connected to each assembling mechanism, and means for moving an article into position so that the predetermined sections engage and move the guide members to position the assembling mechanisms into alignment with the predetermined sections of said article.

3. In a machine for assembling washers on posts extending from an article, a supporting structure, a plurality of washer assembling mechanisms movably mounted upon said supporting structure, a plurality of movably mounted guide members, means for moving an article to position the posts in engagement with the guide members, and means connected to the guide members for moving the assembling mechanisms into alignment with the posts.

4. In an assembling machine, means for advancing articles to an assembling station, a movably mounted assembling device adapted to be moved into alignment with portions of the article, means for supporting said assembling device, locating elements movably mounted at the assembling station, means actuated by the movement of the article for engaging and moving the article into engagement with the locating elements, and means actuated by movement of the locating elements for moving the assembling device into alignment with portions of the articles.

5. In an assembling machine, a supporting structure, means for advancing articles to an assembling station, an assembling device at said station pivotally mounted on said supporting structure, aligning guide elements pivotally mounted and connected to the assembling device, and means actuated by an article moved into the assembling station for moving the article into engagement with the aligning element whereby the article moves the aligning elements to move the assembling device into register with the article.

6. In a machine for assembling washers onto a post extending from an article, a supporting structure, a movably mounted plunger mechanism, a movably mounted holder for a supply of washers, a movably mounted guide member, means for moving an article into position so that the posts engage and position the guide member, means interconnecting said guide members with said holder and plunger mechanism for imparting the movement of the guide member to the holder and the plunger mechanism, feed means operated by said article-moving means for advancing washers from the holder to a position in alignment with the terminal post, and means operated by the advance of the feed means for actuating the plunger mechanism to advance the washers onto the post.

7. In a machine for assembling an annular member on a post extending from an article, a plunger mechanism for advancing the annular member onto the posts, means for supporting said plunger mechanism, a pivotally mounted holding device positioned in register with said plunger mechanism, means for storing a stack of annular members, means for moving an article to position the post in register with the plunger mechanism, means actuated by the movement of the article for feeding an annular member onto the holding device, means actuated by the feeding means for advancing the plunger mechanism, and means mounted on the plunger mechanism for pivoting the holding device to permit the plunger mechanism to advance the annular member onto the post.

8. In a machine for assembling washers on posts extending from an article advanced along a conveyor, a supporting structure, a plurality of movable assembling mechanisms mounted on said supporting structure, a plurality of movably mounted guide members for receiving the posts, a slide block for advancing an article to position the posts in engagement with the guide members, means actuated by the article for advancing the slide block whereby the guide members are positioned by the posts, and means interconnecting the assembling mechanisms with the guide members for moving the assembling mechanisms into alignment with the posts.

9. In a machine for assembling washers on a post extending from an article, a stack for holding washers, a movably mounted forked holding member, means for advancing an article to position a post in alignment with said forked holding member, means actuated by the advance of the post for moving a washer from the stack onto said holding member, a plunger device positioned in alignment with the holding member, means for supporting said plunger device, and means actuated by the washer advancing means for moving the plunger to engage and move the forked holding member and the washer onto the post.

10. In a machine for assembling washers on a post extending from an article as set forth in claim 9 wherein the plunger has mounted thereon means for moving the forked holding member from the post.

11. In a machine for assembling washers on a post extending from an article, a supporting structure, a movably mounted holding member having forked extensions adapted to span a post, means for moving an article to position a post thereon in alignment with the space between the forked extensions, a stack for holding a supply of washers, an apertured guide member positioned in register with the forked extension, means operated by the movement of the article for advancing a washer through said guide member onto said forked extensions, means for moving the extensions toward the post to position the washers on the posts, and means for moving the forked extensions from the washer.

12. In a machine for assembling washers on posts extending from an article, a supporting means, a plurality of movably mounted guide members, means for moving an article to engage the posts with the guide members, said guide members being provided with divergent cam surfaces to be engaged by the posts whereby said posts move the guide members, a plurality of devices for assembling washers on the posts, said devices being movably mounted on said supporting means, means interconnecting each assembling device with one of the guide members for moving the assembling devices into register with the posts, means for storing a supply of washers, means operated by the movement of the article for advancing washers from said storage means into the assembling devices, and means actuated by the washer advancing means for operating the assembling devices.

References Cited in the file of this patent

UNITED STATES PATENTS

| 1,694,875 | Gaisman | Dec. 11, 1928 |
| 1,735,609 | Frederick | Nov. 12, 1929 |
| 1,991,467 | Sawin | Feb. 19, 1935 |
| 2,281,190 | Bertalan | Apr. 28, 1942 |
| 2,359,575 | Norman | Oct. 13, 1944 |
| 2,604,692 | Broden | July 29, 1952 |

UNITED STATES PATENT OFFICE
CERTIFICATE OF CORRECTION

Patent No. 2,910,768

November 3, 1959

Harry W. Heidergott et al.

It is hereby certified that error appears in the printed specification of the above numbered patent requiring correction and that the said Letters Patent should read as corrected below.

Column 4, line 50, after "machine" strike out the comma, and insert -- comprising --.

Signed and sealed this 3rd day of May 1960.

(SEAL)
Attest:

KARL H. AXLINE
Attesting Officer

ROBERT C. WATSON
Commissioner of Patents